(No Model.)  2 Sheets—Sheet 2.

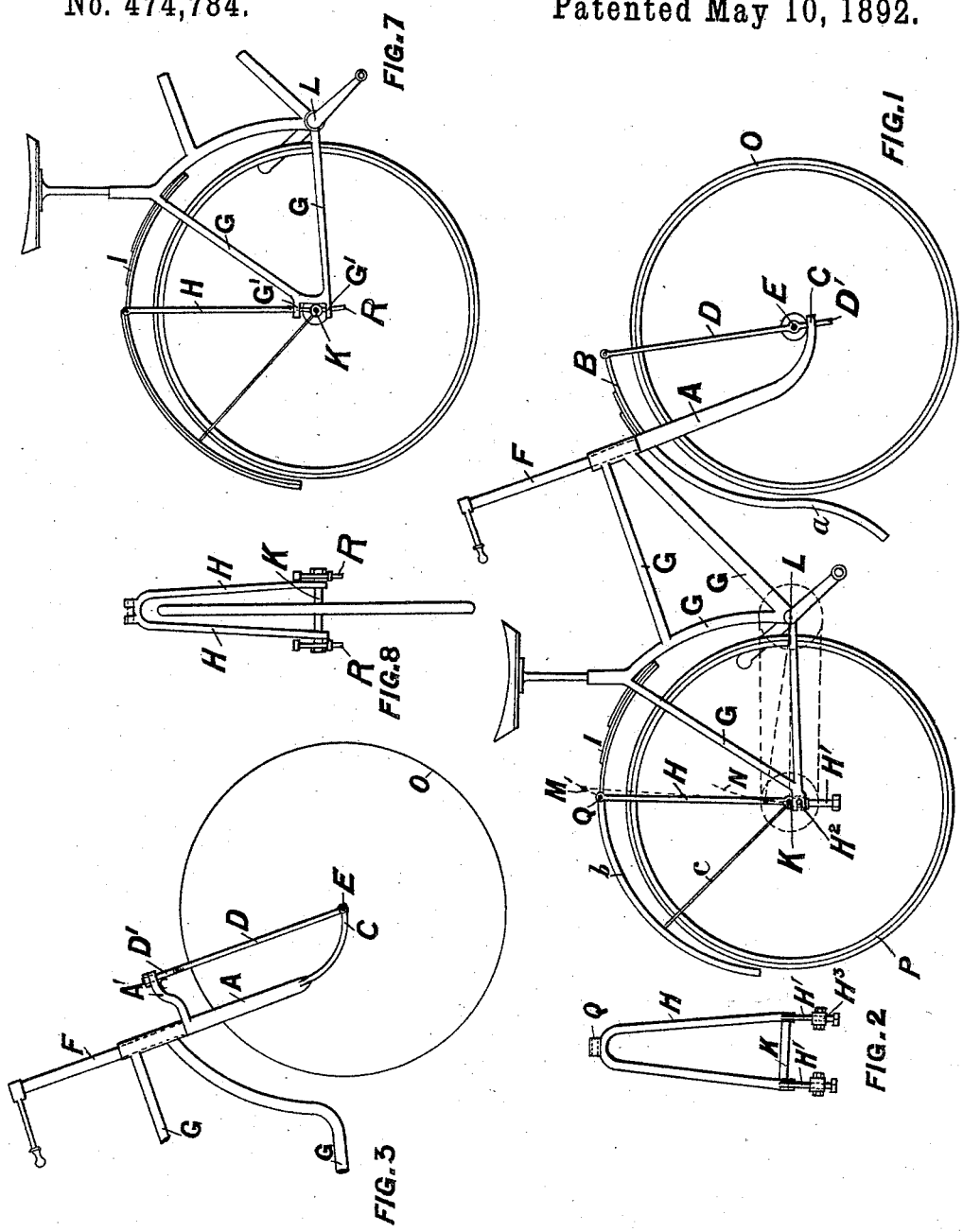

T. J. THOMPSON.
BICYCLE.

No. 474,784. Patented May 10, 1892.

Witnesses:
Walter Allen
Harry S. Rohrer

Inventor
Thomas J. Thompson
by Herbert W. T. Jenner
Attorney

UNITED STATES PATENT OFFICE.

THOMAS JEFFERSON THOMPSON, OF GREYSTONES, IRELAND, ASSIGNOR TO ROSS THOMPSON, OF PORT ARTHUR, CANADA.

BICYCLE.

SPECIFICATION forming part of Letters Patent No. 474,784, dated May 10, 1892.

Application filed October 21, 1891. Serial No. 409,429. (No model.) Patented in England August 19, 1890, No. 12,986; in Germany October 19, 1890, No. 18,226; in France October 21, 1890, No. 209,680; in Belgium October 22, 1890, No. 92,828, and in Canada September 28, 1891, No. 37,476.

*To all whom it may concern:*

Be it known that I, THOMAS JEFFERSON THOMPSON, a citizen of Great Britain, residing at Greystones, in the county of Wicklow and Country of Ireland, have invented certain new and useful Improvements in Bicycles; and I do hereby declare the following to be a full, clear, and exact description of the invention, such as will enable others skilled in the art to which it appertains to make and use the same.

Letters Patent for this invention have been obtained in the following countries: Great Britain, No. 12,986, dated August 19, 1890; France, No. 209,680, dated October 21, 1890; Belgium, No. 92,828, dated October 22, 1890; Germany, No. 18,226, dated October 19, 1890, and Canada, No. 37,476, dated September 28, 1891.

This invention relates to bicycles; and it consists in the novel construction and combination of the parts hereinafter fully described and claimed, whereby the front and rear wheels are separately supported from the frame by springs and are enabled to mount obstructions on the road without varying the distance between the saddle and the treadle-axle.

Figure 4:
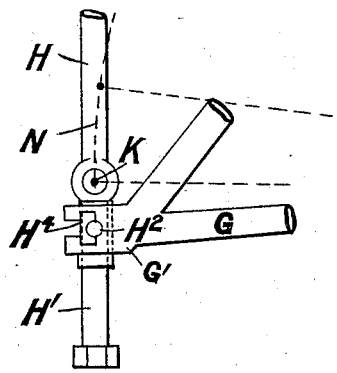
Figure 5:
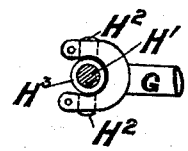
Figure 6:
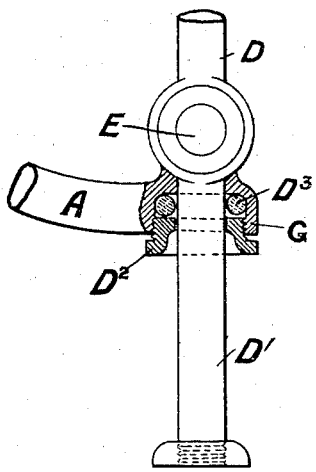

In the drawings, Figure 1 is a side elevation of a bicycle constructed according to this invention. Fig. 2 is an end view of the fork for the rear wheel. Fig. 3 is a detail side view of the fork for carrying the front wheel and shows a modification of the same. Figs. 4 and 5 are respectively an elevation and a plan view of the end of the frame which guides each lower end of the rear-wheel fork, and are drawn to a larger scale. Fig. 6 is a detail view, partly in section, showing the connection of one of the lower ends of the front-wheel fork with the end of the steering-fork. Figs. 7 and 8 are respectively a side elevation and an end view of the rear wheel, showing a modification in the form of the guides.

Referring to Figs. 1 and 2, G is a rigid frame, which carries the saddle and the treadle-axle L, so that the distance between these parts does not vary while the bicycle is being ridden. H is a fork, which carries the axle K of the rear wheel P. The lower ends H' of the fork H slide freely in the guides H³, which are pivoted to the frame G by the pins H². I is a spring secured to the frame G at one end and having the lugs Q of the fork H secured to the other end of it. The rear wheel P is thus free to rise and fall in surmounting stones on the road irrespective of the frame G. It is, however, necessary that the rising motion should be constrained to follow a curve struck from the center of the treadle-axle, in order that the driving-chain may operate freely. If the line followed be different from this curve, the driving-chain will work badly, as it will be tightened or slackened as the rear wheel changes its position. In order that the axle K may follow the curve N, struck from the center of the axle L, as shown in dotted lines, the angle at which the flat spring I is secured to the frame G is so arranged that the lugs Q of the fork H will follow the curve M and constrain the axle K to follow the curve N. As the fork H is attached to the spring above the wheel and has its ends H' guided on each side below the axle, the wheel is prevented from twisting when it rises to surmount an obstacle, such as a stone in the road. The details of one of the guides for the ends H' are shown more clearly in Figs. 4 and 5. The lower end H' of the fork H slides in the guide H³, which is pivoted to the end G' of the frame G by the pins H², which are held in position by blocks H⁴.

In the modification shown in Figs. 7 and 8 the lower ends H' of the fork are omitted, and curved guide-bars R are secured to the axle K instead. These curved bars are concentric with the axle L and slide up and down in holes in the end G' of the frame. This renders the motion of the axle K not wholly dependent on the arrangement of the spring I. The front wheel O is journaled on the axle E, carried by the fork D. A is the steering-fork, provided with lower ends C and having the steering-rod F secured to its upper end and journaled in the frame G. The upper end of the fork D is attached to the end of a spring B, projecting from the fork A, as shown in Fig. 1, and the lower ends D' of the fork D slide in holes in the said ends C of the steering-fork A. By this arrangement the spring B yields when the wheel O rises to surmount an obstacle on the road, and the ends C keep the wheel from twisting. In order that the ends D' of the fork D may slide in the ends C with some frictional resistance, the parts are constructed as shown in detail in Fig. 6. The end C is formed with a chamber, and $D^3$ is a packing-ring in the said chamber. $D^2$ is a screw-threaded nut for compressing the packing-ring in the chamber against the end D' and causing the end to meet with a certain amount of frictional resistance.

A modification of the means for supporting the front wheel O is shown in Fig. 3. In this modification the positions of the parts are reversed from those shown in Fig. 1. Springs $C^2$ are secured to the lower ends of the steering-fork A and to the lower ends of the fork D, and the upper end $D^4$ of the fork D slides in the guide-arm A', projecting from the steering-fork A.

In Fig. 1, *a* and *b* are dash-boards, and *c* is the stay for the dash-board *b*; but these do not form a part of the present invention.

What I claim is—

1. In a bicycle, the combination, with the frame for supporting the seat and the treadle-axle, of a fork for the rear wheel, having its lower ends sliding in guides on the frame, and a spring projecting upwardly and rearwardly from the frame and having its free end pivoted to the upper end of the said fork, substantially as set forth.

2. In a bicycle, the combination, with the frame for supporting the seat and the treadle-axle, of a fork for the rear wheel, having its lower ends curved concentric with the treadle-axle and sliding in guides on the frame, and a spring projecting upwardly and rearwardly from the frame and having its free end pivoted to the upper end of the said fork, substantially as set forth.

3. The combination, with the ends C of the steering-fork, of the ends D' of the fork D, sliding through holes in the said ends C, packing-rings encircling the ends D', and screw-threaded nuts for compressing the said rings in chambers in the ends C and causing them to bear against the ends D', substantially as and for the purpose set forth.

4. The combination, with the frame G, of the spring I, secured thereto, the fork secured to the said spring and provided with ends H', the guides pivoted to the said frame for the ends H' to slide in, and the rear wheel of the bicycle journaled between the said fork and sliding with it, substantially as and for the purpose set forth.

In testimony whereof I affix my signature in presence of two witnesses.

THOMAS JEFFERSON THOMPSON.

Witnesses:
 ALEX. J. REID,
 JAMES MCFARLAND.